W. J. Thompson,
Potato Digger.
No. 92,402. Patented July 6, 1869.
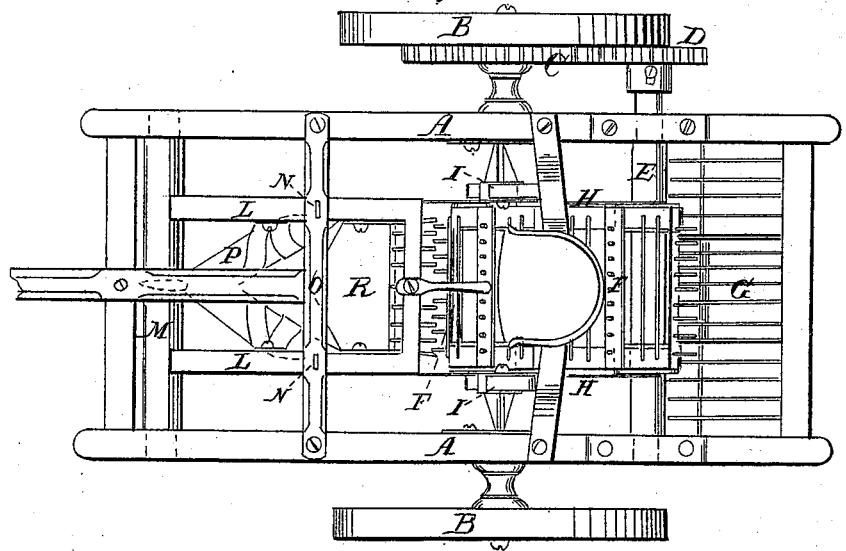
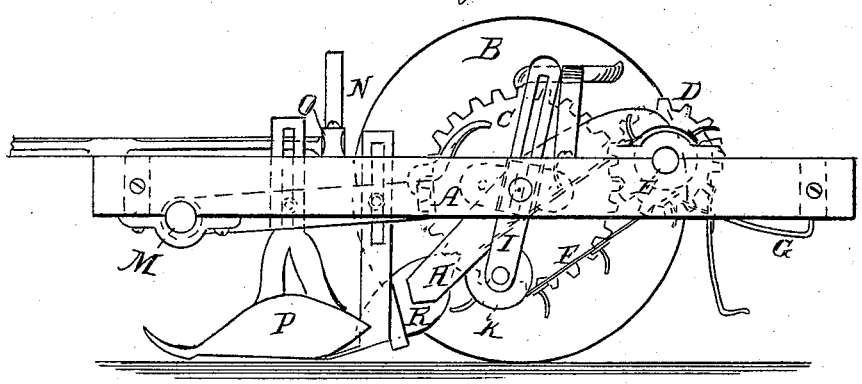
Witnesses:
Inventor:
Wm. J. Thompson
Alexander Mason
Attys.

United States Patent Office.

WILLIAM J. THOMPSON, OF NORMAL, ILLINOIS.

Letters Patent No. 92,402, dated July 6, 1869.

---

IMPROVEMENT IN POTATO-DIGGER AND PICKER.

---

The Schedule referred to in these Letters Patent and making part of the same.

---

*To all whom it may concern:*

Be it known that I, WILLIAM J. THOMPSON, of Normal, in the county of McLean, and in the State of Illinois, have invented certain new and useful Improvements in Combined Potato-Digger and Picker; and do hereby declare that the following is a full, clear, and exact description thereof, reference being had to the accompanying drawings, and to the letters of reference marked thereon, making a part of this specification.

The nature of my invention consists in the construction of a machine for digging and picking potatoes, and in the arrangement of certain devices hereafter set forth and explained.

Figure 1 is a plan view of my invention.

Figure 2 is a side elevation of the same, with one wheel removed.

Letter A represents the frame of my machine, which is supported upon the two driving-wheels B.

Upon the inside surface of one of these wheels, there is cast or secured a cog-wheel, C, which, in revolving, communicates motion to a smaller one, D, for the purpose of operating the endless belt, which carries the potatoes back to the sieve or basket.

This wheel D has a sleeve cast upon its inner surface, in which there is cut an elongated slot. Through this slot there is passed a screw, so that the wheel can be securely fastened at any desired point. When it is not desired to use the machine, as in passing to and from the field, this wheel can be moved back upon the shaft E, so that it will no longer gear with the cog C.

This shaft E extends entirely across the frame, and has two collars cast upon it, which serve as pulleys for the endless belt F.

This belt, which receives the potatoes from the scoop, is composed of two belts, or chains, which are secured together by means of long metal plates and rods. Extending upwards from the plates, there is a number of small curved rods, which carry the potatoes up, and back into the receptacle G, prepared for them on the rear end of the machine. The rods serve to prevent the potatoes from falling through the spaces between the plates. In order to prevent them from running off at the sides of the belts, there has been placed guides, H, at each side, which are screwed to the two slotted uprights, and have their rear ends resting upon the shaft E.

Secured to each of the sides of the frame, there is a slotted upright, I, the lower ends of which support a shaft, K, which is provided with two collars, similar to the one, E, so as to serve as pulleys for the belt F. By having these slotted, the belt can be lowered or raised up above the earth.

The receptacle G, at the rear end of the machine, consists of a grating upon which the potatoes fall as they come from the belt, and which is provided with a door, so that the potatoes can be easily removed.

Pivoted to the front end of the frame is the tilting-frame L, to which the cutter and scoop are both attached. The front end of this frame is secured to the shaft M, which extends all the way across the frame, and allows it to be raised and lowered, by means of the handle or lever at its rear end.

Extending upwards from the top of this frame, there are two upright bars, which pass through mortises cut in the cross-piece O.

As these bars N have a number of holes cut in them, the frame can be regulated in height at will.

Secured to the frame by means of slotted uprights is the cutter P, which is shaped like a plowshare, and which cuts away the vines, and the scoop R, which digs the potatoes up and conveys them back, so that the prongs on the belt can take them up and carry them back. To the back part of this scoop there is attached a rack, extending backwards and upwards, which holds the potatoes until they are taken off. By making the standards slotted, the cutter and scoop can be raised and lowered so as to suit the earth.

Having thus described my invention,

What I claim, and desire to secure by Letters Patent, is—

1. The arrangement, with the frame A, of the slotted standards I I, shaft K, and belt F, all substantially as and for the purposes set forth.

2. The shafts E and K, provided with collars, in combination with the endless belt F, constructed as described, and guides H, when used substantially as described.

3. In combination with the cutter P, scoop R, and belt F, the slotted receptacle G, upon the rear end of the frame A, as set forth.

4. In combination with the frame L, the cutter P and scoop R, when both are provided with the slotted standards, so that they can be regulated at will, substantially as specified.

5. The frame L, cutter P, and scoop R, in combination with the belt F, guides H, shafts E and K, slotted standards I, and wheel D, when all are arranged to form a potato-digger, as described.

In testimony that I claim the foregoing, I have hereunto set my hand, this 15th day of May, 1869.

WILLIAM J. THOMPSON.

Witnesses:
THOMAS SLADE,
W. M. HATCH.